(12) United States Patent
Kirisawa (10) Patent No.: US 6,297,780 B1
(45) Date of Patent: Oct. 2, 2001

(54) MOBILE APPARATUS WITH PLURALITY OF ANTENNAS HAVING DIFFERENT DIRECTIVITIES

(75) Inventor: Akihiro Kirisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/295,388

(22) Filed: Apr. 21, 1999

(30) Foreign Application Priority Data

Apr. 23, 1998 (JP) .................................................. 10-113049

(51) Int. Cl.⁷ ...................................................... G01R 1/24
(52) U.S. Cl. .......................... 343/703; 343/895; 343/702; 455/575
(58) Field of Search ..................................... 343/895, 757, 343/824, 703, 702, 876, 853, 844; 455/62, 78, 80, 82, 83, 575, 562, 65, 101, 277, 115, 129, 121, 123; 375/267; 342/372, 368, 359

(56) References Cited

U.S. PATENT DOCUMENTS

| 5,346,300 | * | 9/1994 | Yamamoto et al. | 343/895 |
| 5,408,690 | * | 4/1995 | Ishikawa et al. | 455/115 |
| 5,471,146 | * | 11/1995 | Krayeski et al. | 342/637 |
| 5,574,981 | * | 11/1996 | Ahonen | 455/67.4 |
| 5,754,104 | * | 5/1998 | Saito | 340/539 |
| 6,021,317 | * | 2/2000 | Irvin | 455/78 |
| 6,072,441 | * | 6/2000 | Tanabe | 343/895 |
| 6,118,409 | * | 9/2000 | Pietsch et al. | 343/703 |

FOREIGN PATENT DOCUMENTS

| 06164232 A | 6/1994 | (JP) . |
| 7-87011 | 3/1995 | (JP) . |
| 8-103039 | 4/1996 | (JP) . |
| 9-27783 | 1/1997 | (JP) . |
| 09223994 A | 8/1997 | (JP) . |

* cited by examiner

Primary Examiner—Tan Ho
Assistant Examiner—Ephrem Alemu
(74) Attorney, Agent, or Firm—Sughrue, Mion, Zinn, Macpeak & Seas, PLLC (57) ABSTRACT

In a mobile apparatus for communication with a satellite, a plurality of antennas having different directivities from each other are provided. A selector circuit is connected between a transmitter circuit and the antennas to select and connect one of the antennas to the transmitter circuit. A control section controls the selector circuit in accordance with a reflected power detected from one of the antennas.

11 Claims, 8 Drawing Sheets

MOBILE APPARATUS WITH PLURALITY OF ANTENNAS HAVING DIFFERENT DIRECTIVITIES

BACKGROUND OF THE INVENTION

1. Field of the Invention

The present invention relates to a mobile station (apparatus) for communication with a satellite.

2. Description of the Related Art

Generally, in a cellular mobile communication system, a service area is divided into a plurality of coverage areas defined by a plurality of base stations. Therefore, when a mobile station moves from one coverage area to another coverage area, a complex call connection control is required. In addition, large blind areas due to the locations of the base stations may be generated, so that a service interruption is created for the mobile stations. In order to dissolve such problems, a mobile satellite communication system where mobile stations can communicate with each other via one or more satellites has been developed.

In a mobile satellite communication system using a plurality of satellites, one satellite may have a relatively large elevation angle with respect to a mobile station, while another satellite may have a relatively small elevation angle with respect to that mobile station. In addition, the mobile station may be located in a blind area of some of the satellites due to buildings or the like. Therefore, a prior art mobile station (apparatus) adopts a single omnidirectional antenna.

In the above-mentioned prior art mobile apparatus, however, it is impossible that the single omnidirectional antenna can have a uniform directivity over an elevation angle of from 0° to 90°. Even if the single omnidirectional antenna establishes a broad directivity, the antenna gain is 0 dBi at most. Therefore, if the antenna gain is forced to be increased, a transmitter circuit (power amplifier) has to be increased in size, thus increasing the manufacturing cost as well as the power dissipation. If the power dissipation is significantly increses, the continuous operation time period of the mobile apparatus is remarkably reduced.

In a system other than in a mobile satellite communication system, note that antenna diversity technology using a plurality of antennas in a receiver side has been used. However, even if antenna diversity technology is applied to a transmitter side, since the frequency of the transmitter side is different from that of the receiver side and the characteristics of the transmitting and receiving antennas are different from each other, this antenna diversity technology is not suitable in the transmitting side.

SUMMARY OF THE INVENTION

It is an object of the present invention to provide a mobile apparatus capable of effectively carrying out communication with a satellite without increasing a transmitter circuit in size and power dissipation.

According to the present invention, in a mobile apparatus for communication with a satellite, a plurality of antennas having different directivities from each other are provided. A selector circuit is connected between a transmitter circuit and the antennas to select and connect one of the antennas to the transmitter circuit. A control section controls the selector circuit in accordance with a reflected power detected from one of the antennas.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENTS

Figure 1:
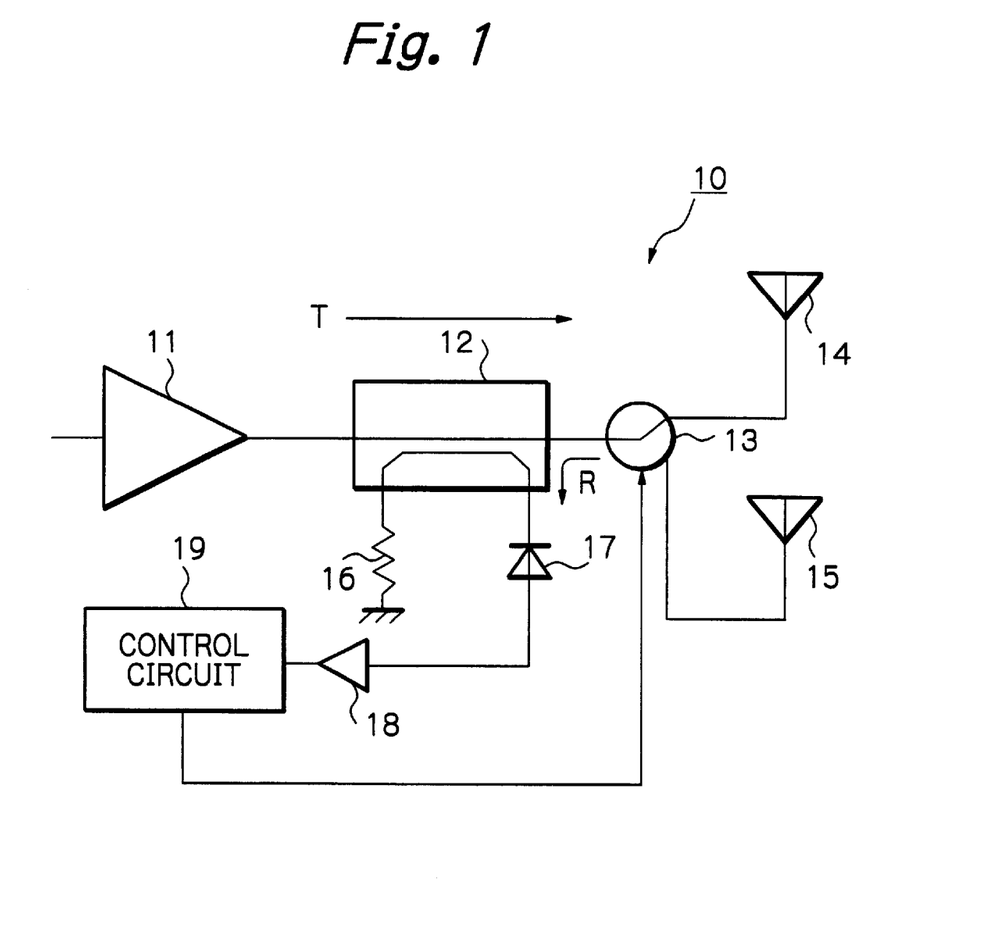
FIG. 1 is a circuit diagram illustrating a first embodiment of the mobile apparatus according to the present invention.

In FIG. 1, which is a circuit diagram illustrating a first embodiment of the mobile apparatus according to the present invention, a mobile apparatus 10 is constructed by a transmitter circuit (power amplifier) 11. The power amplifier 11 is connected via a directional coupler 12 which is also connected via a selector circuit 13 to antennas 14 and 15.

The directional coupler 12 is connected to a terminal resistor 16 and a detecting diode 17 which is also connected via an operational amplifier 18 as a voltage amplifier to a control circuit 19. Note that the control circuit 19 can be constructed by a microcomputer or the like.

In the directional coupler 12, a transmitting signal T from the power amplifier 11 to the selector circuit 13 is not coupled to the detecting diode 17, while a reflected signal R from the selector circuit 13 is coupled to the detecting diode 17.

The selector circuit 13 is constructed by a switch circuit using diodes or the like.

The control circuit 19 includes a comparator for comparing the power of the reflected signal R detected by the detecting diode 17 with a predetermined value. When the power of the reflected signal R is larger than the predetermined value, the control circuit 19 controls the selector circuit 13 to change the connection of the antennas 14 and 15 to the directional coupler 12. For example, when the antenna 14 is connected to the directional coupler 12, the connection of the antenna 14 to the directional coupler 12 may be switched to the connection of the antenna 15 to the directional coupler 12. On the other hand, when the antenna 15 is connected to the directional coupler 12, the connection of the antenna 15 to the directional coupler 12 may be switched to the connection of the antenna 14 to the directional coupler 12.

Figure 2A:
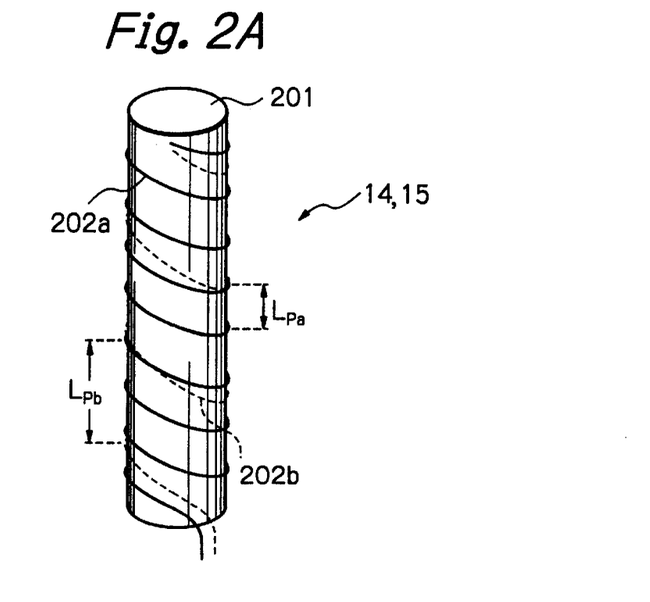
FIG. 2A is a helical antenna apparatus including the antennas of FIG. 1.
Figure 2B:
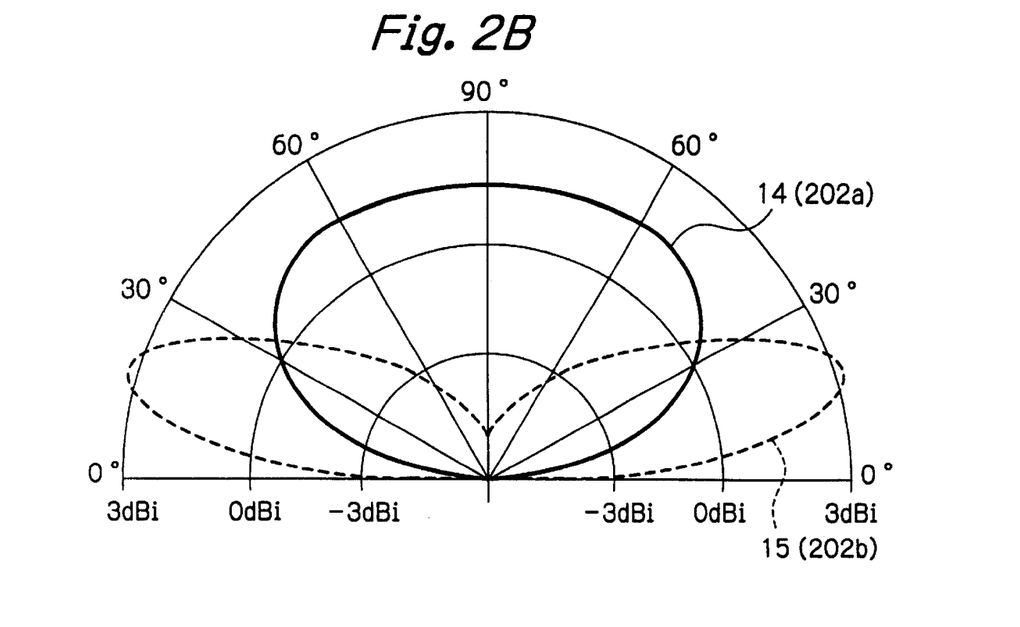
FIG. 2B is a radiation pattern generated by the helical antenna apparatus of FIG. 2A.

In FIG. 2A, which illustrates a helical antenna apparatus including the antennas 14 and 15 of FIG. 1, reference numeral 201 designates a cylindrical element on which two helical conductors 202a and 202b for the antennas 14 and 15, respectively, are spirally wound. When the helical conductor 202a or 202b is excited, a circular polarization of radio waves is radiated therefrom. In this case, a spacing (pitch) $L_{pa}$ between turns of the helical conductor 202a is smaller than a spacing (pitch) $L_{pb}$ between turns of the helical conductor 202b. As a result, as shown in FIG. 2B, which is a radiation pattern generated by the helical antenna apparatus of FIG. 2A, the directivity of the antenna 14 (the helical conductor 202b) will cover a satellite having a relatively small elevation angle.

Since the helical antennal apparatus of FIG. 2A has only two distinct directivities, the radiation pattern can be obtained at a gain of about 2 to 3 dBi or more. Note that a prior art omnidirectional radiation pattern can be obtained at a gain of about 0 dBi at most.

Figure 3:
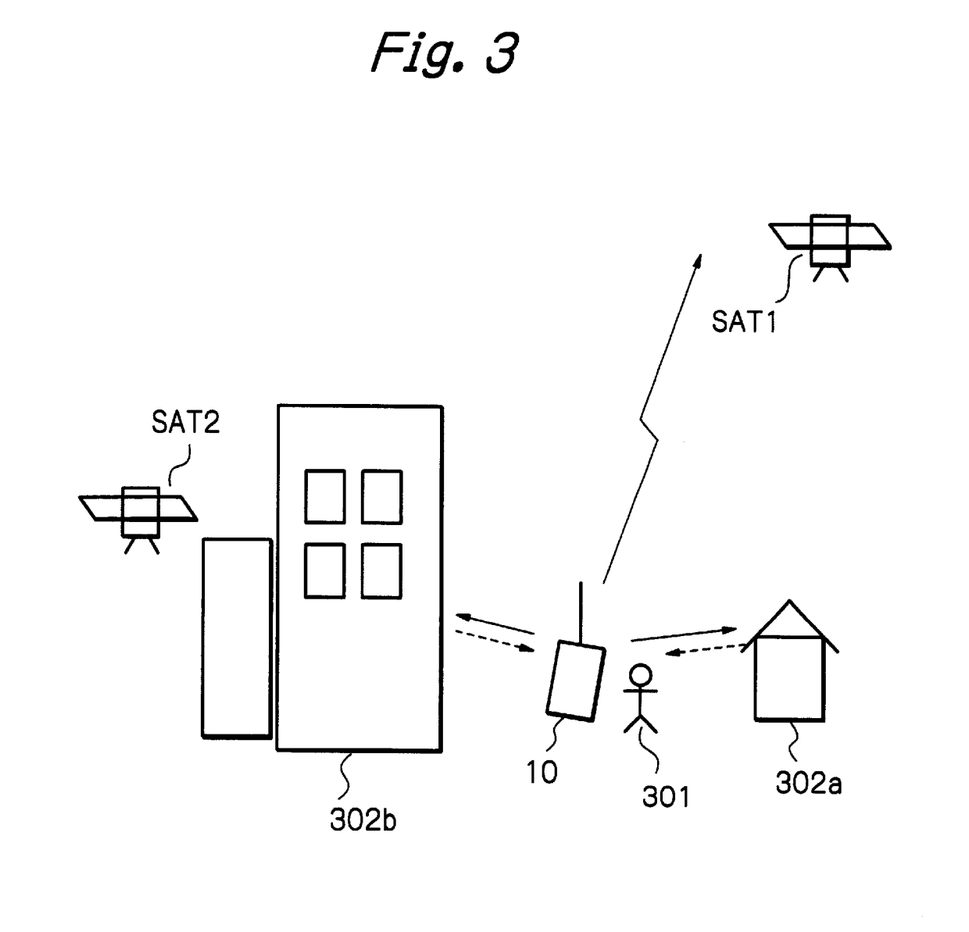
FIGS. 3 and 4 are diagrams for explaining the operation of the mobile apparatus of FIG. 1.

The operation of the mobile apparatus 10 of FIG. 1 where the mobile apparatus 10 is located in a situation as illustrated in FIG. 3 is explained below. Note that, in FIG. 3, a satellite SAT1 has a large elevation angle, and a satellite SAT2 has a small elevation angle. Also, reference numeral 301 designates a person, and 302a and 302b designate buildings.

First, assume that the selector circuit 13 selects the antenna 15. In this case, radio waves are reflected from the human 301 and the buildings 302a and 302b. Therefore, a power of reflected radio waves is detected by the detecting diode 17 and is transmitted via the operational amplifier 18 to the control circuit 19. As a result, if the detected power exceeds the predetermined value, the control circuit 19 controls the selector circuit 13, so that the selector circuit 13 selects the antenna 14. Thus, the mobile apparatus 10 can communicate with the satellite SAT1.

Figure 4:
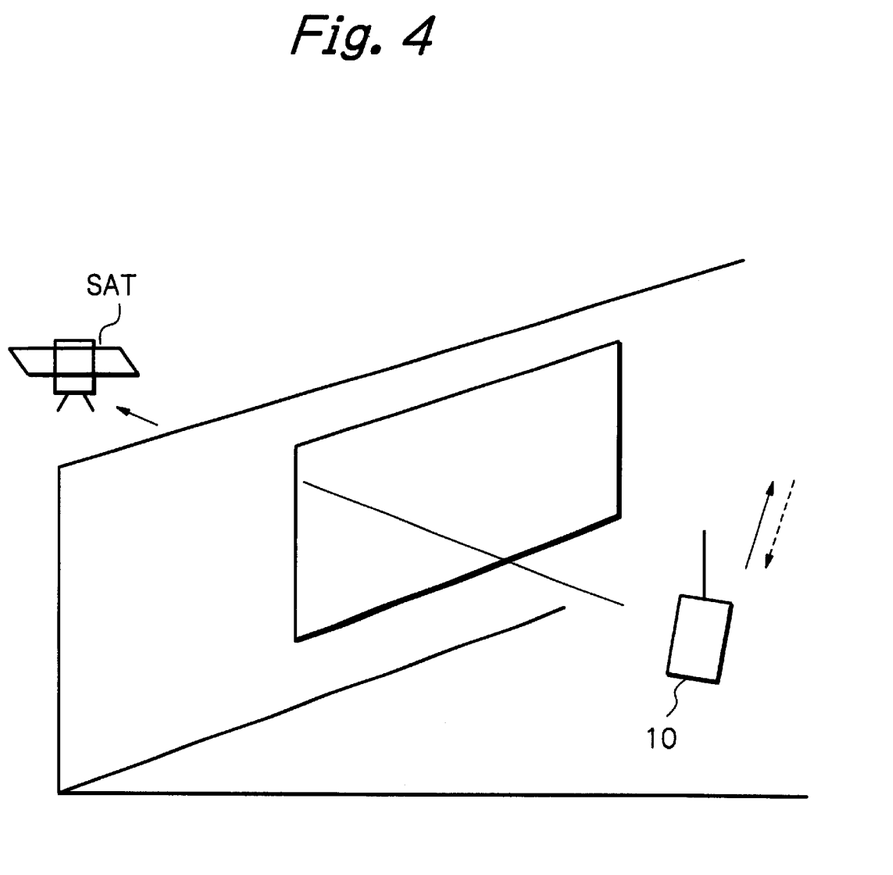

The operation of the mobile apparatus 10 of FIG. 1 where the mobile apparatus 10 is located in a room as illustrated in FIG. 4 is explained below. Note that, in FIG. 4, a satellite SAT has a small elevation angle.

First, assume that the selector circuit 13 selects the antenna 14. In this case, radio waves are reflected from the wall or the like. Therefore, a power of reflected radio waves is detected by the detecting diode 17 and is transmitted via the operational amplifier 18 to the control circuit 19. As a result, if the detected power exceeds the predetermined value, the control circuit 19 controls the selector circuit 13, so that the selector circuit 13 selects the antenna 15. Thus, the mobile apparatus 10 can communicate with the satellite SAT.

Figure 5:
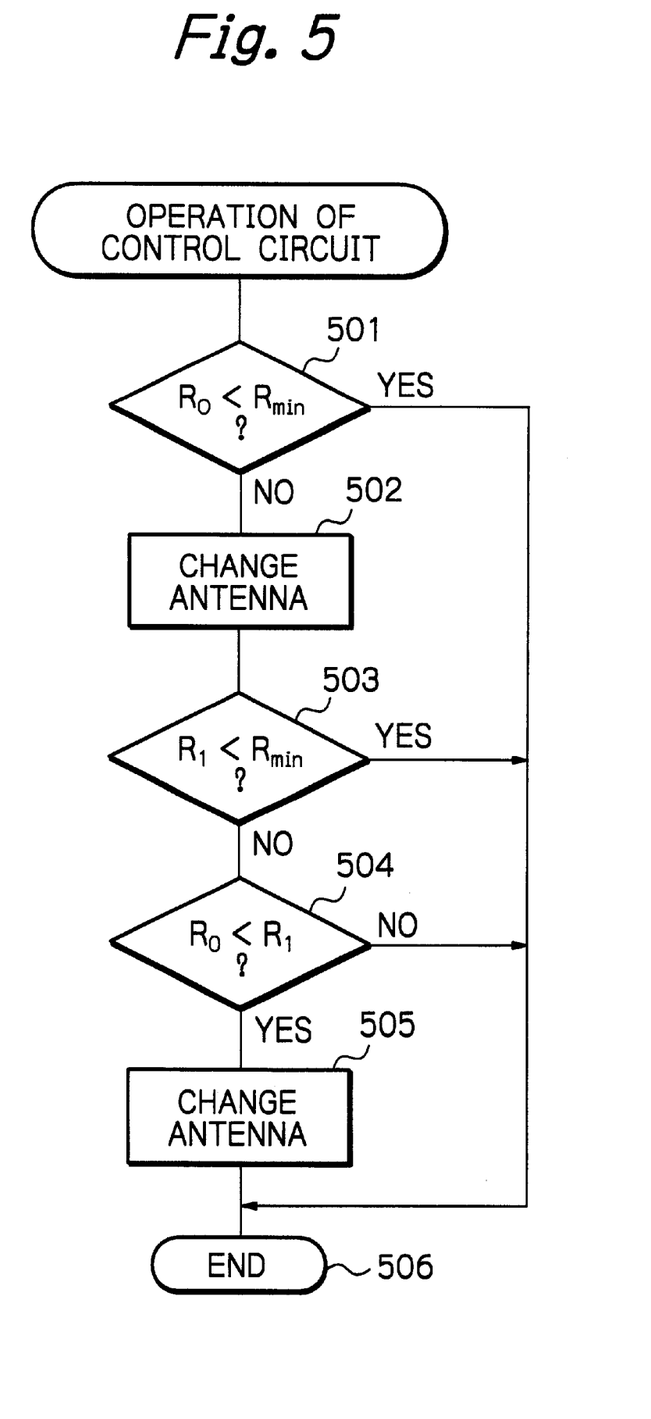
FIG. 5 is a flowchart showing the operation of the control circuit of FIG. 1.

The operation of the control circuit 19 is generally as illustrated in FIG. 5. The flowchart of FIG. 5 is carried out when the mobile apparatus 10 is powered ON and is carried out at every predetermined time period.

First, at step 501, it is determined whether or not a reflected power $R_0$ detected by the detecting diode 17 is smaller than a predetermined value $R_{min}$. Only when $R_0 \geq R_{min}$ does the control proceed to step 502. Otherwise, the control proceeds directly to step 506 where the connection of the antenna is not changed.

At step 502, the antenna connection is changed. For example, if the antenna 14 is currently selected, the antenna 15 is then selected. On the other hand, if the antenna 15 is currently selected, the antenna 14 is then selected. Then, the control proceeds to step 503.

At step 503, it is determined whether or not a reflected power $R_1$ detected by the detecting diode 17 is smaller than the predetermined value $R_{min}$. Only when $R_1 \geq R_{min}$ does the control proceed to step 504. Otherwise, the control proceeds directly to step 506 where the connection of the antenna is not changed.

When $R_0 \geq R_{min}$ and $R_1 \geq R_{min}$, the control proceeds to step 504 which determines whether or not $R_0 < R_1$. As a result, if $R_0 < R_1$, the antenna connection is changed. Otherwise, the control proceeds directly to step 506. That is, in this case, one of the antennas having a smaller reflected power is selected.

Figure 6:
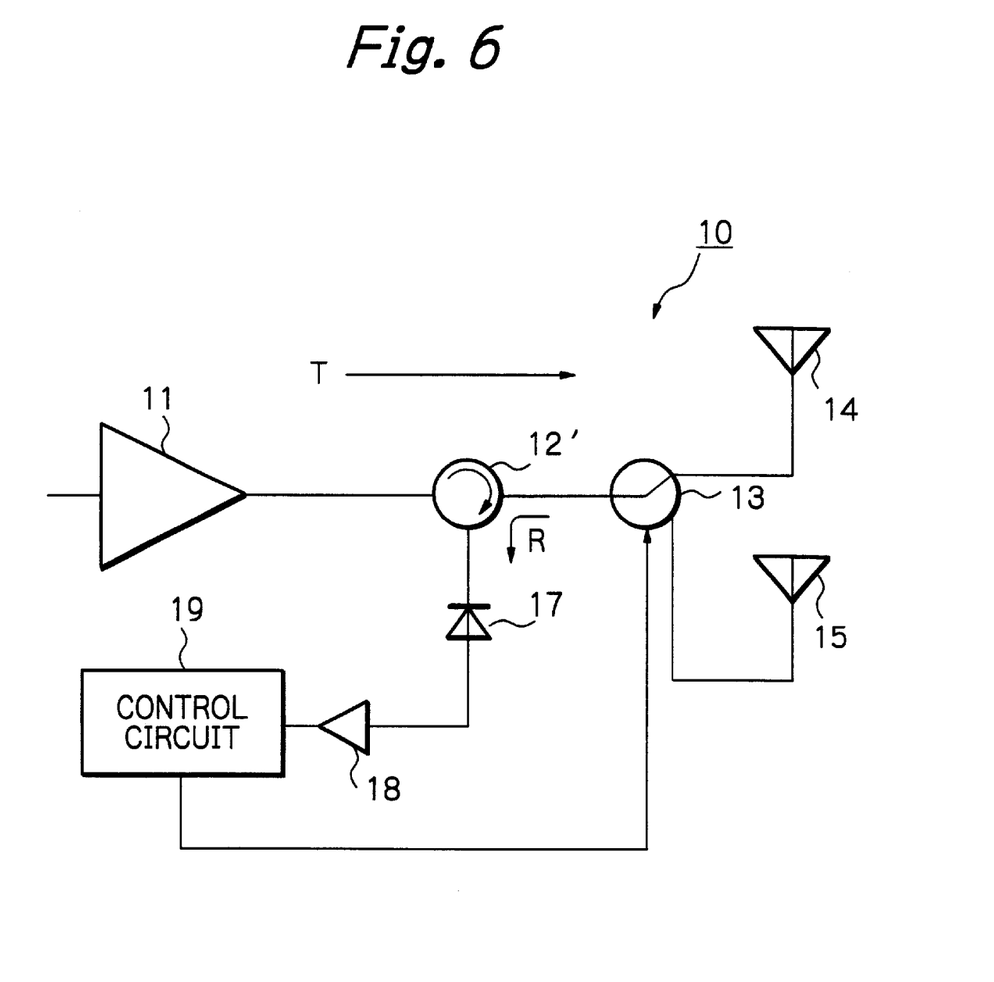
FIG. 6 is a circuit diagram illustrating a second embodiment of the mobile apparatus according to the present invention.

In FIG. 6, which is a circuit diagram illustrating a second embodiment of the mobile apparatus according to the present invention, a circulator 12' is provided instead of the directional coupler 12 of FIG. 1. Also, in this case, the terminal resistor 16 of FIG. 1 is not provided.

In the circulator 12', a transmitting signal T from the power amplifier 11 to the selector circuit 13 is not coupled to the detecting diode 17, while a reflected signal R from the selector circuit 13 is coupled to the detecting diode 17.

Thus, the mobile apparatus of FIG. 6 operates in the same way as the mobile apparatus of FIG. 1.

Figure 7:
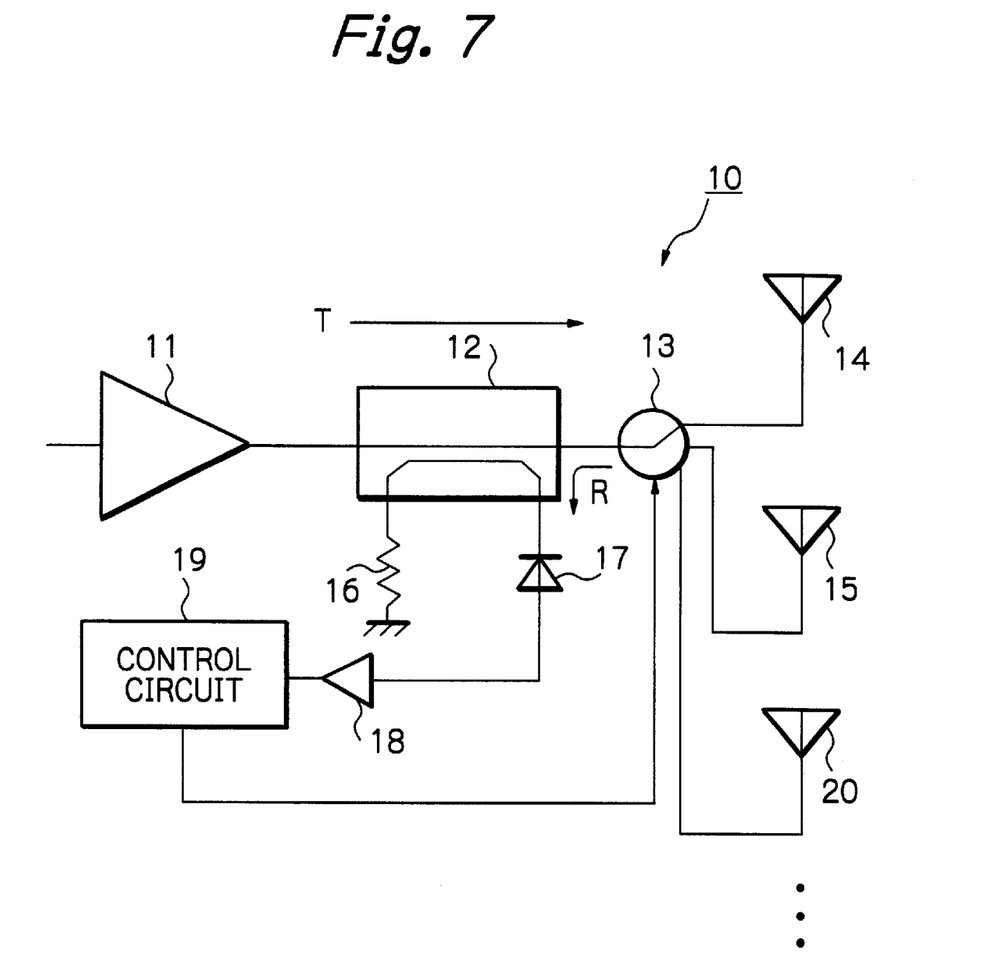
FIGS. 7 and 8 are circuit diagrams illustrating modifications of the mobile apparatus of FIG. 1.

In the above-described embodiments, only two antennas 14 and 15 are provided; however, three or more antennas having different directivities from each other can be provided as illustrated in FIG. 7 where antennas 20 are added. In this case, in FIG. 5, steps similar to steps 502 and 503 are added for each of the added antennas, and steps similar to steps 504 and 505 are provided to select one of the antennas having the smallest reflected power.

Figure 8:
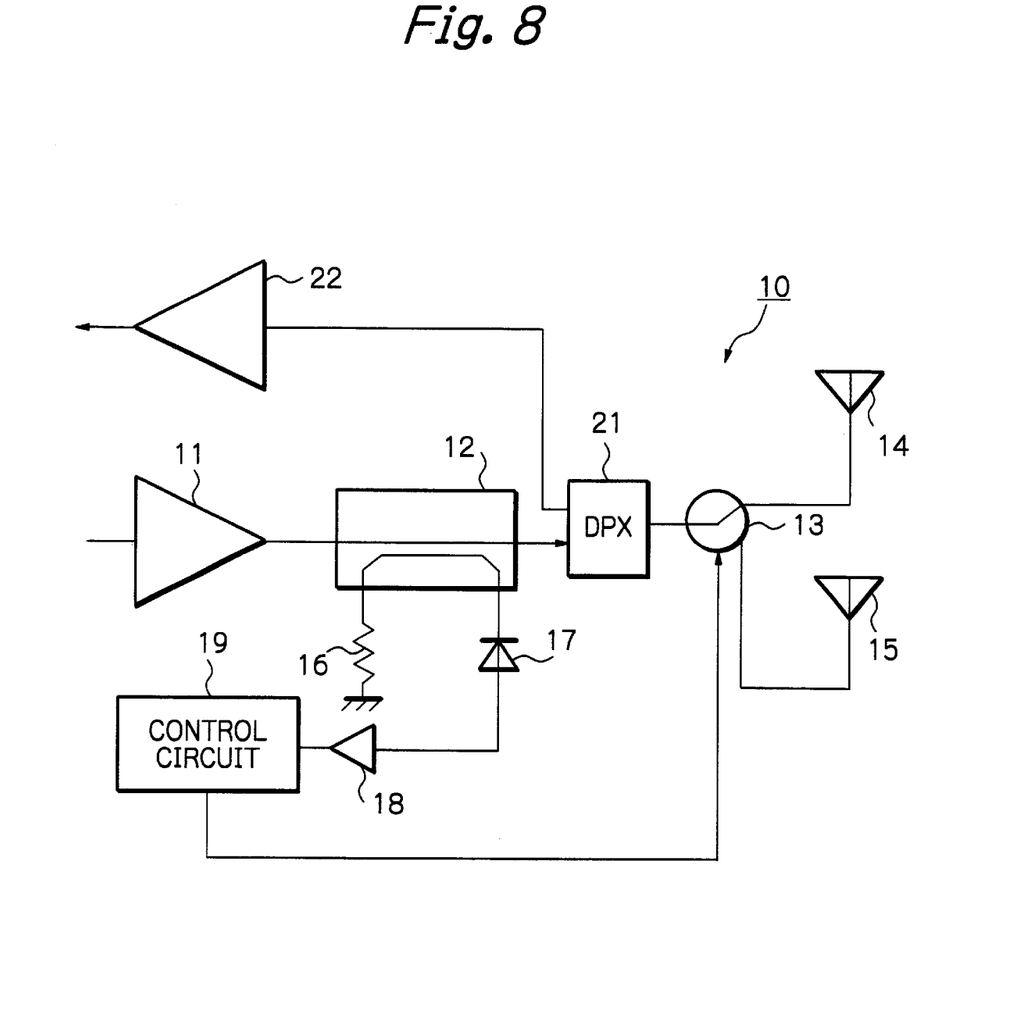

In addition, in the above-described embodiments, the antennas 14 and 15 are transmitting antennas; however, the antennas 14 and 15 can serve as receiving antennas as well as the transmitting antennas. In this case, as illustrated in FIG. 8, a duplexer 21 and a receiver circuit (power amplifier) 22 are provided. In this case, the duplexer 21 selects the transmitter circuit 11 in a transmitting mode and selects the receiver circuit 22 in a receiving mode.

Further, in the above-described embodiments, the antennas 14 and 15 are provided on a single coaxial cable; however, the antennas 14 and 15 can be provided on individual coaxial cables.

As explained hereinabove, according to the present invention, since a plurality of antennas having different directivities from each other are provided, the mobile apparatus can effectively communicate with a satellite without increasing the power dissipation.

What is claimed is:

1. A mobile apparatus for communication with a satellite comprising:
   a transmitter circuit;
   a plurality of antennas having different elevation angle directivities from each other;
   a selector circuit connected between said transmitter circuit and said antennas, for selecting and connecting one of said antennas to said transmitter circuit; and
   a control section, connected to said selector circuit, for controlling said selector circuit in accordance with a reflected power detected from said connected one of said antennas.

2. The apparatus as set forth in claim 1, wherein, when the reflected power detected from said one of said antennas is not smaller than a predetermined value, said control section controls said selector circuit to select another of said antennas.

3. The apparatus as set forth in claim 1, wherein, when all the reflected powers from said antennas are not smaller than a predetermined value, said control section controls said selector circuit to select one of said antennas having the smallest reflected power.

4. The apparatus as set forth in claim 1, wherein said control section comprises:
   a directional coupler, connected between said transmitter circuit and said selector circuit, for taking out the reflected power from the connected one of said antennas, said directional coupler passing a transmitting signal from said transmitter circuit to said selector circuit;
   a detecting diode, connected to said directional coupler, for receiving the reflected power from said one of said antennas; and a control circuit, connected to said detecting diode, for comparing the reflected power from the connected one of said antennas with a predetermined value and controlling said selector circuit to select and connect to a different one of said plurality in accordance with whether or not the reflected power from said connected one of said antennas is smaller than said predetermined value.

5. The apparatus as set forth in claim 4, wherein, when all reflected powers from said antennas are not smaller than said predetermined value, said control circuit controls said selector circuit to select one of said antennas having the smallest reflected power.

6. The apparatus as set forth in claim 1, wherein said control section comprises:

a circulator, connected between said transmitter circuit and said selector circuit, for taking out the reflected power from said connected one of said antennas, said circulator passing a transmitting signal from said transmitter circuit to said selector circuit;

a detecting diode, connected to said circulator, for receiving the reflected power from said connected one of said antennas; and a control circuit, connected to said detecting diode, for comparing the reflected power from said connected one of said antennas with a predetermined value and controlling said selector circuit to connect to a different one of said antennas in accordance with whether or not the reflected power from said connected one of said antennas is smaller than said predetermined value.

7. The apparatus as set forth in claim 6, wherein, when all reflected powers from said antennas are not smaller than said predetermined value, said control circuit controls said selector circuit to select one of said antennas having the smallest reflected power.

8. A mobile apparatus for communication with a satellite comprising:

a transmitter circuit;

a plurality of antennas having different elevation angle directivities from each other;

a selector circuit connected between said transmitter circuit and said antennas, for selecting and connecting one of said antennas to said transmitter circuit; and a control section, connected to said selector circuit, for controlling said selector circuit in accordance with a reflected power detected from said connected one of said antennas, wherein said plurality of antennas comprise:

a single cylindrical element; and a plurality of helical conductors wound on said cylindrical element, each of said helical conductors performing as one of said antennas, each of said helical conductors having different pitches from each other.

9. The apparatus as set forth in claim 1, further comprising:

a duplexer connected between said transmitter circuit and said selector circuit; and a receiver circuit connected to said duplexer, said duplexer connecting said transmitter circuit to said selector circuit in a transmitting mode and connecting said receiver circuit to said selector circuit in a receiving mode.

10. A mobile apparatus comprising:

a transmitter circuit;

a plurality of antennas having different elevation angle directivities from each other;

a selector circuit, connected between said transmitter circuit and said antennas, for selecting and connecting said antennas to said transmitter circuit;

a directional coupler, connected between said transmitter circuit and said selector circuit, for passing a transmitting signal from said transmitter circuit to said selector circuit and taking out a reflected power from said connected one of said antennas;

a control section, connected between said directional coupler and said selector circuit, for controlling said selector circuit in accordance with the reflected power from said connected one of said antennas.

11. A mobile apparatus comprising:

a transmitter circuit;

a plurality of antennas having different elevation angle directivities from each other;

a selector circuit, connected between said transmitter circuit and said antennas, for selecting one of the said antennas and connecting said one of said antennas to said transmitter circuit;

a circulator, connected between said transmitter circuit and said selector circuit, for passing a transmitting signal from said transmitter circuit to said selector circuit and taking out a reflected power from said one said antennas; and a control section, connected between said circulator and said selector circuit, for controlling said selector circuit in accordance with the reflected power from said one of said antennas.

* * * * *

UNITED STATES PATENT AND TRADEMARK OFFICE
CERTIFICATE OF CORRECTION

PATENT NO.     : 6,297,780 B1
DATED          : October 2, 2001
INVENTOR(S)    : Akihiro Kirisawa It is certified that error appears in the above-identified patent and that said Letters Patent is hereby corrected as shown below:

Column 1,
Line 38, delete "increses" insert -- increased --

Column 2,
Line 65, after "14" insert -- (the helical conductor 202a) will cover a satellite having a relatively large elevation angle, while the directivity of the antenna 15 --

Signed and Sealed this

Twenty-fifth Day of June, 2002

*Attest:*

*Attesting Officer*

JAMES E. ROGAN
*Director of the United States Patent and Trademark Office*